(12) United States Patent
Berry et al.

(10) Patent No.: US 7,241,411 B2
(45) Date of Patent: *Jul. 10, 2007

(54) THIN FILM STRIPS

(75) Inventors: Craig J. Berry, Westport, CT (US); Walter Klauser, Ringwood, NJ (US)

(73) Assignee: Acupac Packaging, Inc., Mahwah, NJ (US)

( * ) Notice: Subject to any disclaimer, the term of this patent is extended or adjusted under 35 U.S.C. 154(b) by 217 days.

This patent is subject to a terminal disclaimer.

(21) Appl. No.: 10/922,502

(22) Filed: Aug. 20, 2004

(65) Prior Publication Data

US 2005/0019588 A1   Jan. 27, 2005

Related U.S. Application Data

(63) Continuation-in-part of application No. 10/226,451, filed on Aug. 23, 2002, now Pat. No. 6,824,829.

(51) Int. Cl.
*B29C 41/24*   (2006.01)
*B05D 3/02*   (2006.01)

(52) U.S. Cl. ............... 264/160; 264/213; 264/216; 427/372.2; 34/459; 34/483

(58) Field of Classification Search ............ None
See application file for complete search history.

(56) References Cited

U.S. PATENT DOCUMENTS

| | | | |
|---|---|---|---|
| 4,562,020 A | 12/1985 | Hijiya et al. | 264/39 |
| 5,377,428 A | 1/1995 | Clark | 34/446 |
| 5,629,003 A | 5/1997 | Horstmann et al. | 424/401 |
| 5,948,430 A | 9/1999 | Zerbe et al. | 424/435 |
| 6,419,903 B1 | 7/2002 | Xu et al. | 424/49 |
| 6,596,298 B2 | 7/2003 | Leung et al. | 424/435 |
| 6,824,829 B2 * | 11/2004 | Berry et al. | 427/372.2 |

* cited by examiner

*Primary Examiner*—Mark Eashoo
(74) *Attorney, Agent, or Firm*—Perman & Green, LLP (57) ABSTRACT

A method of forming a thin film strip and thin film strips formed thereby where the method comprises coating a liner substrate with a wet slurry of film forming ingredients and other components and drying the wet slurry in a drying apparatus to form a film, measuring the moisture content of the film either during of upon exit from the drying apparatus, and storing the film in a minimal moisture loss environment during a curing process.

17 Claims, 7 Drawing Sheets

THIN FILM STRIPS

CROSS-REFERENCE TO RELATED APPLICATIONS

This application is a continuation-in-part of, and claims priority from, U.S. application Ser. No. 10/226,451, filed on Aug. 23, 2002, now U.S. Pat. No. 6,824,829.

BACKGROUND OF THE INVENTION

Field of the Invention

The present invention is generally related to the processing of thin films, and in particular to the formation of coated film strips. More specifically, it relates to water soluble coated film strips and to edible water soluble thin film strips.

SUMMARY OF THE INVENTION

The present invention is directed to methods of forming thin film strips and to strips formed by such methods. In one embodiment the method comprises coating a liner substrate with a wet slurry of film forming ingredients and drying the wet slurry to form a film. Since many film forming systems require the removal of some but not all the moisture in the film, the moisture content of the film is monitored during and/or after drying under conditions that are varied to meet the moisture content requirements of the film being produced. After exiting from the drying operation, the film is stored in a controlled environment where, during a curing process, the moisture content is maintained or modified to reach the desired level of moisture in the finished product.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
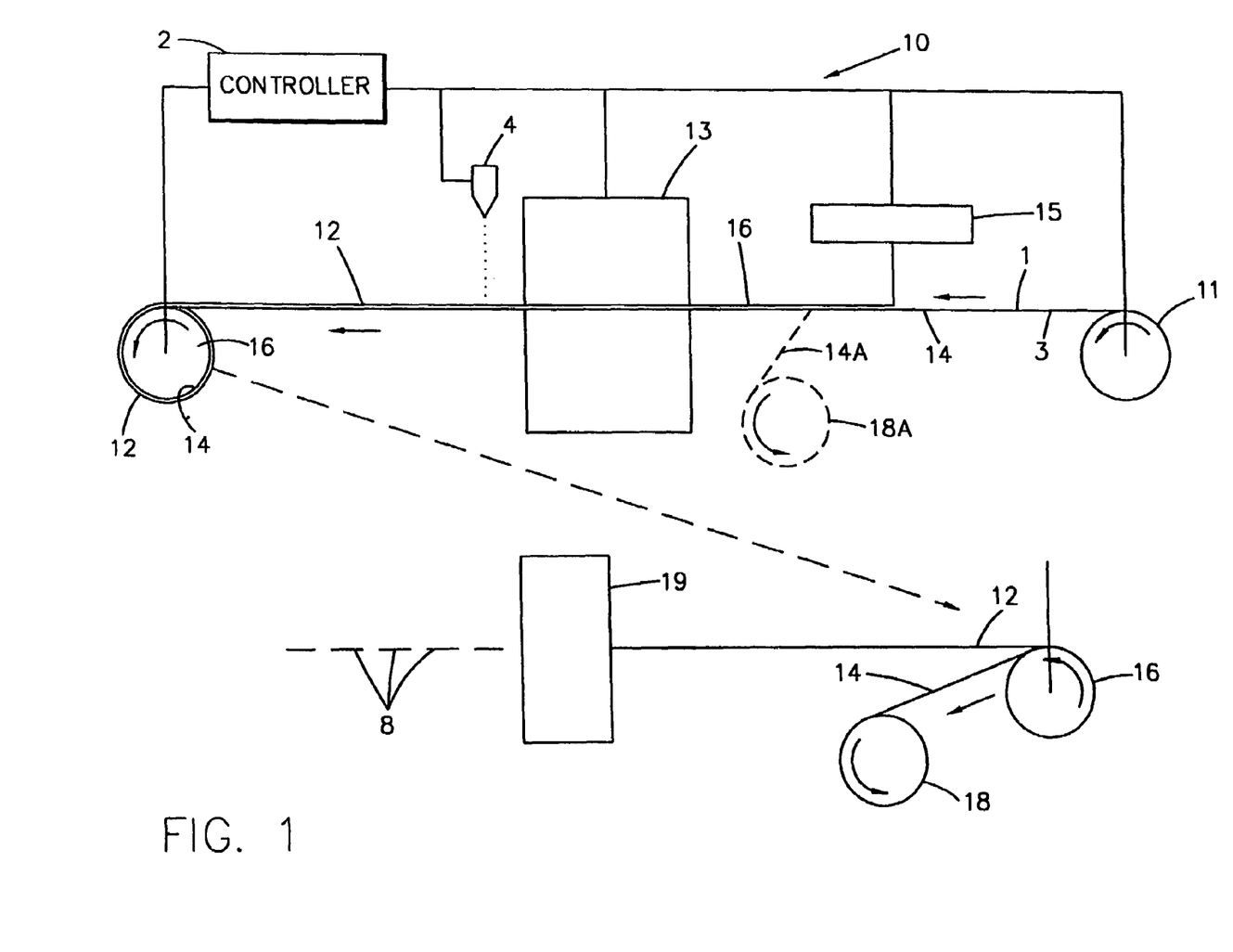
FIG. 1 is a schematic diagram of a system incorporating features of the present invention.

Referring to FIG. 1, a schematic diagram of a system 10 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

As shown in FIG. 1, the system 10 is generally adapted to coat, dry and cut a relatively thin film forming material 12 into small strips 8. Preferably, each strip 8 of thin film 12 is approximately 1 inch×1 inch (2.54 cm×2.54 cm), although any suitable dimensions can be used.

Water soluble films, particularly orally edible films can include many ingredients. The base ingredients for forming a film may include water, which can be later partially or completely dried out of the film, and a film forming agent. The film may include additives for purposes of promoting the integrity of the film, plasticizing, stabilizing, emulsifying, filling thickening, or binding the film.

The film can be used as a delivery system for agents that do not necessarily increase the functionality of the film but which provide a benefit to the user.

The formed film 12 is generally a thin, dissolvable film. In one embodiment, the formed film 12 is adapted to be an edible film for oral intake and use, such as saliva stimulating agents, cooling agents, flavorants, coloring agents, sweeteners, fragrances, for the purpose of breath freshening, oral hygiene, and dispensing of medicaments and nutraceuticals In another embodiment, the thin, dissolvable film comprises water, a soluble polymer and a cosmetic or skin care product incorporated within the polymer matrix.

Where the film forming, water soluble polymer is water soluble it may be composed of, but is not limited to polymers selected from pullulan, hydroxypropylmethyl cellulose, hydroxyethyl cellulose, hydroxypropyl cellulose, polyvinyl pyrrolidone, carboxymethyl cellulose, polyvinyl alcohol, sodium alginate, polyethylene glycol, pectin, tragacanth gum, guar gum, acacia gum, Arabic gum, polyacrylic acid, methylmethacrylate copolymer, carboxyvinyl polymer, gelatin, amylase, high amylase starch, hydroxypropylated high amylase starch, dextrin, chitin, chitosan, levan, elsinan, collagen, zein, gluten, soy protein isolate, whey protein isolate, casein and mixtures thereof.

Recognized film-forming agents include, xanthan gum, polysaccharides, natural gums, polypeptides, polyacrylates, starch, karaya gum, mixtures thereof and others.

Other film forming agents which can be used include, but are not limited to, cellulose ethers; modified starches; natural gums; edible polymers; hydrocolloid flours; seaweed extracts; land plant extracts; derivatives thereof; and combinations thereof.

Examples of cellulose ethers include, but are not limited to, methylcellulose, ethylcellulose, hydroxymethylcellulose, hydroxyethylcellulose, hydroxypropylmethylcellulose, carboxymethylcellulose, derivatives thereof and combinations thereof.

Modified starch examples include, but are not limited to, acid and enzyme hydrolyzed corn and potato starches. Further examples of natural gums include, but are not limited to, gum arabic; locust bean gum; carageenan gum; karaya; ghatti; tragacanth agar; tamarind gum; xanthan gum; derivatives thereof; and combinations thereof.

Examples of edible polymers include, but are not limited to, microcrystalline cellulose; cellulose ethers; xanthan; derivatives thereof; and combinations thereof. Examples of hydrocolloid flour include, but are not limited to, guar gum; locust bean; microcrystalline cellulose; tara; derivatives thereof and combinations thereof.

Seaweed extract examples include, but are not limited to, alginates; carageenans; derivatives thereof; and combinations thereof. Land plant extract examples include, but are not limited to, konjac; pectin; arabinoglactan; derivatives thereof; and combinations thereof.

It should be appreciated by those skilled in the art, that there are other edible water-soluble film forming agents which exhibit desirable properties.

Preferred film forming water soluble polymers are pullulan, hydroxypropylethyl cellulose, hydroxyethyl cellulose, hydroxypropyl cellulose, carboxymethyl cellulose, sodium alginate, pectin, and mixtures thereof.

The most preferred film forming water-soluble polymers are pullulan, pectin, and mixtures thereof.

In general, the effective amount of the film forming agent ranges from approximately about 10% to about 90%, more preferably 25% to about 75% dry weight of the film composition.

Other ingredients may be added to the blend for the purpose of stabilizing and plasticizing the film.

A bulk filler agent may be present, especially in pullulan free edible film compositions, to modify texture of the compositions. The effective amount of the bulk filler agent can range from approximately 10% to about 90%.

Pullulan free edible film compositions can include an effective amount of carageenan, microcrystalline cellulose and polyethylene glycol. To enhance the structure of the formed film, hydroxyethyl cellulose can be incorporated.

Useful binding agents include starch, casein and pullulan in amounts up to about 0 to about 10 wt %.

Useful thickening agents include, but are not limited to, cellulose ethers, such as hydroxyethyl cellulose, hydroxypropylmethyl cellulose, or hydroxypropyl cellulose, either alone, or mixtures thereof. Other useful thickening agents include methylcellulose, carboxylmethylcellulose, and the like, in amounts up to about 20 wt %. Polymers are also useful thickeners, such as carbomer, polyvinyl pyrrolidone, carboxymethyl cellulose, polyvinyl alcohol, sodium alginate, polyethylene glycol, natural gums like xanthan gum, tragacantha, guar gum, acacia gum, arabic gum, water-dispersible polyacrylates like polyacrylic acid, methylmethacrylate copolymer, carboxyvinyl copolymers. The concentration of a water-soluble polymer in the final film can be as desired or can vary between 20 and 75% (w/w).

A bulk filler agent may be added to the film forming agent for many purposes, including modifying the texture of the compositions. The effective amount of the bulk filler can vary, and can range from approximately 10% to about 90% by dry weight of the film composition. Suitable bulk filler agents include, but are not limited to, magnesium carbonate; calcium carbonate; calcium phosphate; calcium sulfate; magnesium silicate; aluminum silicate; ground lime stone; clay; talc; titanium dioxide; microcrystalline cellulose; cellulose polymers such as wood; derivatives thereof; and combinations thereof.

To improve flexibility and reduce brittleness of the edible film compositions, a softener or plasticizing agent, may be used. The effective amount of the plasticizing agent of the present invention can vary up to about 20% dry weight of the film composition.

There are limitations to the amount of the plasticizer that can be used in the film. When excessive plasticizer is employed, the film looses structural integrity, becomes too flimsy and significantly, becomes sticky such that it tends to adhere to other strips of film in the package forming a block. This is especially true when the strips are stacked in a vial, which is a preferred form of primary packaging. In general, from about 0 to about 50 percent plasticizer may be present, preferably form about 0 to about 15 percent. In multi-layer films, the amount of plasticizer present may vary in each film layer.

Suitable plasticizing agents of the present invention include, but are not limited to, polyols such as sorbitol; glycerin; polyethylene glycol; propylene glycol; monoacetin; diacetin; triacetin; hydrogenated starch hydrolysates; corn syrups; derivatives thereof; and combinations thereof. A polyalcohol may be used to achieve the desired level of softness of the film. Examples of polyalcohols include glycerol, polyethylene glycol, propylene glycol, glycerol monoesters with fatty acids or other pharmaceutically used polyalcohols. The concentration of the polyalcohol in the dry film may range between 0.1 and 5% (w/w). Some plasticizers are water soluble and are miscible with a polymer.

Some suitable plasticizers for oral-mucosal contact and other use in body cavities include glycerin, sorbitol, any of the glycols, polysorbate 80, triethyl titrate, acetyl triethyl titrate, and tributyl titrate.

Surfactants may optionally be included in the films. Useful surfactants include mono and diglycerides of fatty acids and polyoxyethylene sorbitol esters. When a combination of surfactants is used, the first component may be a polyoxyethylene sorbitan fatty acid ester, while the second component may be a polyoxyethylene alkyl ether or a polyoxyethylene castor oil derivative. Other surfactants include fatty acid ester, pluronic acid, sodium lauryl sulfate, and the like. The total concentration of surfactants in the final film depends on the properties of the other ingredients, but may stay between 0.1 and 5% (w/w).

Useful stabilizing agents include xanthan gum, locust bean gum and carrageenan, in amounts ranging from about 0 to about 10 wt % or otherwise. Other suitable stabilizing agents include guar gum and the like.

If desired, an emulsifier may be included in the film. An emulsifier may be desired if the film includes oily components which normally would not mix with the water component used in making the film. Emulsifiers may improve manufacturability and consistency of the film. Example emulsifying agents include casein, triethanolamine stearate, quaternary ammonium compounds, acacia, gelatin, lecithin, bentonite, veegum, and the like. Amounts typically range from about 0 to about 5 wt % or otherwise.

In addition to the film forming components other components are added to provide benefits to the user. "Other components", for the purposes of this application, include ingredients that are added to the film for the purpose of being delivered to the site or use and which are not added to the ingredients used in forming the film for the purpose of modifying the characteristics of the film itself. Other components includes "active components", "inactive components", "volatile components" and "volatile active components" within the scope of its meaning.

"Active components" for the purpose of the application, include ingredients that react with the site of application when applied thereto. "Inactive components" are components that provide a barrier or covering to the site of application but do not react with the application site. "Volatile components" are components that evaporate under ambient conditions. "volatile active components" are components that are both active and volatile.

The other components must be compatible with the film matrix but may otherwise range widely. The other components may be fragrance or flavor components, they may be emollients or other dermatological agents, they may be pharmacologically active agents, or pesticides, herbicides, spermacides or other active agents.

The water soluble films may be applied to inanimate objects, such as counter tops, floors, bathroom fixtures or they may be applied to animal or vegetable surfaces, such as plant leaves for depositing a leaf shine or pesticide product or to animal fur as a flea preventative. Many of its most important uses are for application to human beings through dermal, transdermal, bucal or mucosal means.

The films are useful for dermal application of dermatological or cosmetic substances, such as skin emollients, fragrances or lip or skin colorants, including UV protectants and artificial bronzers. A particularly important use is as an antiseptic for open wounds providing an easy method of immediately cleansing the wound surface prior to application of a protective covering.

Any agents that improve or treat skin when applied topically may be easily and inexpensively added to the thin film composition. These agents may include, for example, nutrients such as vitamins, minerals, amino acids, antioxidants, sunscreen agents, or one or more skin peeling compounds (e.g., alpha-hydroxyisobutyric acid). Additionally, one or more preservatives (e.g., isobutylparaben) or fragrances may also be added to the composition.

Examples of other materials having skin improvement activity include allantoin, aloe extract, ginseng extract, placenta extract, bovine blood freed of protein, and fermentation metabolites.

Examples of the materials having the activity to inhibit peroxide lipid are α hydroxy acid, vitamin A, β carotene, vitamin $B_{12}$, vitamin E, pigments such as dimethylaminostyryl heptyl methyl thiazolium iodide and platonin, scutellaria root, rutin, sesame extract and tea extract. As the cell activators, Quaternium-45, glycolic acid, γ amino acid, sialic acid, royal jelly, and ginseng extract, etc. are known.

Known cell activators also include materials which promote collagen synthesis and materials having the activity to improve the skin. Examples of such materials include ascorbic acid, various growth factors such as transforming growth factor β1, platelet-derived growth factor, fibroblast growth factor and insulin-like growth factor 1, and silk protein.

A viscosity-enhancing agent, such as carboxymethylcellulose or a derivative thereof or polyacrylic acid polymer in a concentration of about 0.1% to about 2% by weight may also be added to the aqueous composition.

Color additives, foundations, moisturizers and skin treatments may be incorporated into rapidly dissolving films for use in applying unit dosed applications of cosmetic colorants, foundations, moisturizers and skin treatments to various parts of the face and body, including, but not limited to, the eyes, lips, hands, and face.

The colorants, foundations, moisturizers and treatments, which may be incorporated into the film delivery system, include, but are not limited to iron oxides, mica, alpha hydroxy acids, beta hydroxy acids, TiO2 and mica, polymethyl methacrylate [beads], salicylic acid, and benzoyl peroxide.

The film may be used to deliver the active ingredient or cosmetic by several different techniques depending on the specific film and active or cosmetic ingredient.

In one embodiment, the film is utilized by dissolving with sufficient amounts of water to form a smooth spreadable composition of a slurry or cream like consistency and smoothing the composition onto the user's skin.

The films are useful for transdermal delivery of active ingredients.

The films are useful for bucal administration of flavorants, mouth fresheners, and oral antiseptics. In one important application they are useful for the delivery of unit doses of pharmacologic agents.

The films are useful for mucosal administration of vaginal deodorants, fragrances, pH modifiers, spermacides, hemorrhoidal anti inflammatories or pharmaceutically active agents.

In other embodiments, the film is striped with different side-by-side formulations, or layered with distinct film formula laminations.

The amount of active ingredient that can be contained in a thin film is limited by a number of constraints, primary among those being film thickness, strip size, solubility, brittleness and curling.

More than one flavor may be present in a film. This can be accomplished two ways: First, by using multiple feed streams of differently flavored films when manufacturing the films; and second, by having a multiple-layer film with each layer of a different flavor. In the latter case, the film can be co-manufactured, or can be bonded together with a water soluble edible binder. For example, one layer can be caramel flavored and the other layer can be chocolate flavored. As another example, a single layer film can be striped with alternating layers that are cherry flavored with a red color and vanilla flavored with a white color.

The flavorings that can be used include those known to the skilled artisan, such as natural and artificial flavors. These flavorings may be chosen from synthetic flavor oils and flavoring aromatics, and/or oils, oleo resins and extracts derived from plants, leaves, flowers, fruits and so forth, and combinations thereof. Representative flavor oils include: spearmint oil, cinnamon oil, peppermint oil, clove oil, bay oil, thyme oil, cedar leaf oil, oil of nutmeg, oil of sage, and oil of bitter almonds. Also useful are artificial, natural or synthetic fruit flavors such as vanilla, chocolate, coffee, cocoa and citrus oil, including lemon, orange, grape, lime and grapefruit and fruit essences including apple, pear, peach, strawberry, raspberry, cherry, plum, pineapple, apricot and so forth. These flavorings can be used individually or in admixture. Commonly used flavors include mints such as peppermint, wintergreen, spearmint, birch, anise and such fruit flavors, as cherry, lemon-lime, orange, grape, artificial vanilla, cinnamon derivatives, and others, whether employed individually or in admixture. Flavorings such as aldehydes and esters including cinnamyl acetate, cinnamaldehyde, citral, diethylacetal, dihydrocarvyl acetate, eugenyl formate, p-methylanisole, and so forth may also be used. Generally, any flavoring or food additive, such as those described in Chemicals Used in Food Processing, publication 1274 by the National Academy of Sciences, pages 63–258, may be used.

Further examples of aldehyde flavorings include, but are not limited to acetaldehyde (apple); benzaldehyde (cherry, almond); cinnamic aldehyde (cinnamon); citral, i.e., alpha citral (lemon, lime); neral, i.e. beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese); valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e. trans-2 (berry fruits); tolyl aldehyde (cherry, almond); veratraldehyde (vanilla); 2,6-dimethyl-5-heptenal, i.e. melonal (melon); 2-6-dimethyloctanal (green fruit); and 2-dodecenal (citrus, mandarin); cherry; grape; mixtures thereof; and the like.

The amount of flavoring employed is a matter of preference subject to such factors as flavor type, individual flavor, and strength desired. Thus, the amount may be varied in order to obtain the result desired in the final product. Such variations are within the capabilities of those skilled in the art without the need for undue experimentation. In general, amounts of about 0.1 to about 30 wt % are useable with amounts of about 2 to about 25 wt % being useful and amounts from about 3 to about 7 weight percent may be more useful.

Suitable sweeteners that can be included are those well known in the art, including both natural and artificial sweeteners.

Water-soluble sweetening agents such as monosaccharides, disaccharides and polysaccharides such as xylose, ribose, glucose (dextrose), mannose, galactose, fructose (levulose), sucrose (sugar), maltose, invert sugar (a mixture of fructose and glucose derived from sucrose), partially hydrolyzed starch, corn syrup solids, dihydrochalcones, monellin, steviosides, and glycyrrhizin may be used.

Water-soluble artificial sweeteners such as the soluble saccharin salts, i.e., sodium or calcium saccharin salts, cyclamate salts, the sodium, ammonium or calcium salt of 3,4-dihydro-6-methyl-1,2,3- - -oxathiazine-4-one-2,2-dioxide, the potassium salt of 3,4-dihydro-6-methyl-1,2,3-oxathiazine-4-one-2,2-dioxide (acesulfame-K), the free acid form of saccharin, and the like may be used.

Also useful are dipeptide based sweeteners, such as L-aspartic acid derived sweeteners, such as L-aspartyl-L-phenylalanine methyl ester (aspartame) and materials described in U.S. Pat. No. 3,492,131, L-alpha-aspartyl-N-(2,2,4,4-tetramethyl-3-thietanyl)-D-alaninamide hydrate, methyl esters of L-aspartyl-L-phenylglycerin and L-aspartyl-L-2,5,dihydrophenyl-glycine, L-aspartyl-2,5-dihydro-L-phenylal-anine, L-aspartyl-L-(1-cyclohexyen)-alanine, and the like.

Water-soluble sweeteners derived from naturally occurring water-soluble sweeteners, such as a chlorinated derivative of ordinary sugar (sucrose), and protein based sweeteners such as thaumatoccous danielli (Thaumatin I and II).

Other sweeteners may be used as well.

The disclosed films solve the problems associated with high loadings of active ingredients by laminating multiple layers of thin films to one another, where the films have physical and/or chemical properties which are modified depending on the function that layer plays in the laminate structure. Thus, higher loading may be provided in inner layers with the outer layers having lower loadings or even no actives present. In general the mount of actives that may be utilized ranges from 0 to 70 percent by weight. In most cases it is preferred to limit the amount of actives to less than twenty percent.

This disclosure provides for the use of multiple layers to increase active loading significantly beyond current single or bi-layer films. In general, there may be any number of layers of film in excess of two. For most applications, 3 to 5 layer laminates will provide the expected benefits.

The thickness of the single or multi-layer films can vary widely. It is preferably that the thickness be in the range of from about 0.25 to about 12 mils, preferably from about 0.5 to about 2 mils. It should be recognized that multi-layer films will be thicker than single layer films.

For example, one preferred embodiment contains a bottom layer with high plasticizer content, a middle layer with a high active loading and a top layer with high plasticizer content. The resulting film lamination or sandwich remains flat and flexible even if the middle layer became brittle.

Where multiple active ingredients are desired, each may reside in its own laminate layer having different physical or chemical properties. Where two active ingredients are interreactive, the separate layers will significantly extend the shelf life of the product or even allow the development of new products by preventing interaction until utilized by the customer or patient.

A further embodiment anticipates that one or more of these layers may also contain air bubbles that increase surface area for improved dissolution.

These films can be manufactured individually and the multiple layers combined after manufacture but in a preferred embodiment the films are manufactured simultaneously. The simultaneous manufacturing process requires the selection of thin films that have the correct rheology so that they don't merge into one another during the manufacturing process.

Exemplary coating methods are a slot die for up to 3 layers of film slurries that have a viscosity range of approximately 15 Cp to 20,000 Cp, or a slide coater for up to 18 layers of film slurries with a viscosity range of approximately 1 Cp to 500 Cp.

Other coating methods could be used with coating layers that are not coterminous.

The film is adapted to have a low tensile strength so that it dissolves readily when placed in a high moisture environment such as the mouth, for example. The film 12 is generally formed by coating a film forming slurry 6 on a surface of a suitable substrate 14 and drying the film forming slurry 6 on the substrate 14. In one embodiment, a drying oven 13 can be used to dry the slurry 6. After drying, the substrate 14 can be delaminated from the dried coating or film 12. In an alternate embodiment, the substrate 14 can be delaminated from the coated slurry 6 after the coating stage. After drying, the dried film 12 can then be cut into strips 8 for subsequent packaging.

The slurry 6 generally comprises a mixture of film forming ingredients. During the coating stage, the slurry 6 is cast or coated onto the substrate 14. In one embodiment, a slot die is used to coat the wet slurry 6 onto the substrate 14. In alternate embodiments any suitable film forming coating or casting system can be used to coat the wet slurry onto the substrate, including for example, a knife over roll system. It is a feature of the present invention to be able to coat the slurry 6 onto the substrate 14 with a degree of accuracy wherein the thickness of the film forming slurry 6 is not dependent upon the thickness of the paper or substrate 14. In the preferred embodiment, the slot die can sit approximately 10 millimeters above the paper. The more slurry that is pumped, the more slurry that is coated onto the paper.

In one embodiment, the substrate 14 is a liner-backed paper stock. The substrate 14 can include a coating 1,3 on each side of the substrate that allows the slurry 6 or film 12 to be readily separated from the backer substrate 14, while still maintaining adequate surface tension. The coating 1 on one side of the substrate 14 is generally adapted to provide adequate surface tension to allow the film forming slurry 6 to spread out on the substrate as well as bond to the substrate 14. The coating 1 must also be able to provide sufficient release ability to allow the dried film 12 to be removed from the substrate 14. The coating 3 on the other side of the substrate 14 is generally adapted to allow the substrate 14 and film 12 to be rolled onto itself without any adhering effects. The coating 1, 3 on the backing substrate or paper 14 provides versatility and advantages over the properties of a heat belt or continuous web.

Figure 2:
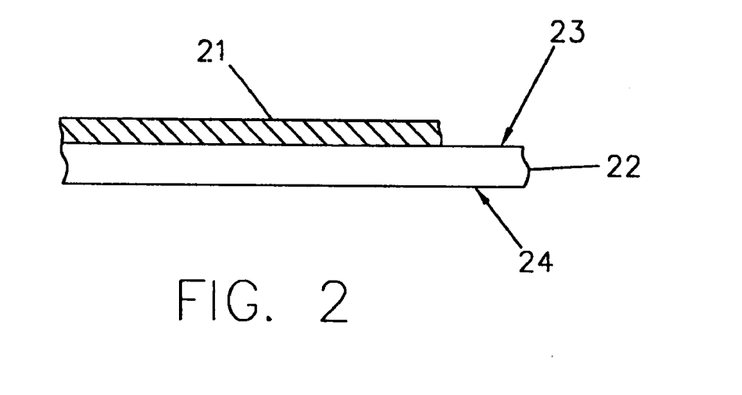
FIG. 2 is a side view of a substrate coated with a film forming slurry in the system illustrated in FIG. 1.

Referring to FIG. 2, an illustration of a wet film forming slurry 21 is shown coated or cast onto the substrate 22. In this embodiment, the substrate 22 comprises a liner-backer that is coated on both sides 23, 24. One side 23 is coated with for example, a silicone. The film forming slurry 21 is cast or coated onto the polyethylene side 23 of the substrate 22. In alternate embodiments, the substrate can include any suitable coating material that allows the film forming slurry 21 to release from the substrate 22 after it is dried as well as allow the side 23 of the substrate 22 coated with the film forming slurry 21 to be rolled onto itself.

Referring to FIG. 2, the polyethylene coating 23 on the substrate 22 enables the film forming slurry 21 to spread out over the polyethylene surface of the substrate. The film forming slurry 21 is coated or cast onto the polyethylene side 23 of the substrate 22 in a wet form. The polyethylene surface 23 provides the film forming slurry 21 with a surface that it can bond to, but still provides a "release ability" that enables the film forming slurry fibers to be relatively easily removed after further processing. The surface tension of the polyethylene surface 23 allows the film forming slurry 21 to remain relatively flat as the slurry 21 is coated onto the substrate, but the surface tension is not too much to keep it from coming off or being removed during subsequent processing. The relationship of the paper or substrate 22 to the slurry 21 is important to the overall process.

Referring to FIG. 1, after the film forming slurry 6 has been coated onto the substrate 14, the combination of the substrate 14 and slurry 6 is passed through a drying oven 13. The drying oven 13 is generally adapted to dry the slurry 6 while retaining the flavor content of the slurry 6 in the film 12 formed by the drying process. Although a drying oven 13 is shown and described, any suitable drying device can be used that is adapted to dry a film forming slurry while retaining volatile active components in the resulting product. It is a feature of the present invention to minimize the amount of volatile active components "flashed" off the drying slurry.

The drying oven 13 generally comprises a through drying oven that is adapted to heat and dry the film forming slurry 6 at relatively low temperatures and low speeds. In one embodiment, the drying oven 13 is a multizone reflow oven in which the drying temperature can be varied in every zone. The drying temperatures in the oven 13 can be "ramped up" slowly as substrate with the film forming slurry thereon travels through the oven.

The amount of air flowing through the oven is recirculated in order to keep volatile active components in the ambient environment. Approximately 70% of the air can be recirculated in order to assist in retaining the volatile active components in the resulting film 12. The combination of drying at low temperatures and low speeds and recirculating air, helps in minimizing the amount of volatile active components that are flashed off during the drying process. By maintaining a certain amount of volatile active components in the ambient environment during drying, more volatile active components are retained in the resulting dried film 12.

As shown in FIG. 1, the system 10 can further include one or more moisture meters 4. The moisture meter 4 is generally adapted to measure a moisture content of the film 12 as it exists in the oven 13. in alternative embodiments, especially where the drying apparatus contains different temperature zones, multiple moisture meters are used at various point in the drying line. In one embodiment, the moisture meter 4 comprises an inline, infra-red moisture meter. In alternate embodiments, any suitable moisture detection system can be used to determine moisture content of a film. It is a feature of the present invention to continuously monitor a moisture content of the film 12 as it dries within the apparatus and/or as it exists in the drying oven 13 and control a speed and/or temperature [especially in a multiple zone dryer] of the drying process on the basis of the measured moisture content. In one embodiment, the inline moisture meter 4 traverses the web of the film 12 as it exits the drying oven.

For manufacturing and production purposes the film 12 should not be too wet or dry. In one embodiment, the residual moisture content of the film 12 as it exists in the drying oven 13 should be in the range of from about 5 to about 30, preferably from about 11 to about 23 and most typically approximately 16–19% of water content by weight.

In alternate embodiments, any suitable residual moisture content can be used that achieves a desired product. It is a feature of the present invention to correlate the measured residual water content of the dried film to the speed of the substrate 14 and web as it passes through the drying oven 13. For example, if the residual moisture content reading is higher than desired, the controller 2 is adapted to adjust the speed of the web so that more time is spent traveling through the drying oven.

In one embodiment, the controller 2 could also adjust the temperature(s) of the zone(s) of the oven 13 to adapt for the differences between a desired and the measured residual moisture content. For example, if the measured residual moisture content is too low, the temperatures in the various zones could also be reduced. The controller 2 receives the measured moisture content and then determines whether or not to change the speed of the web and/or change the temperature of the oven.

As shown in FIG. 1, the backing substrate 14 is generally fed into the coating stage from a roller 11. The backing substrate 14 can have a width of any suitable dimension. The width of the substrate 14 is also referred to herein as a "web". The coating device 15 coats the film forming slurry onto the substrate 14. As shown in FIG. 1, in one embodiment, the backing paper 14*a* can be delaminated after the coating stage and rolled onto roll 18*a*. The film-forming slurry 6 is then dried in the drying oven 13 to form the film 12.

After the film 12 is dried, the backing substrate 14 and film 13 is rewound on itself onto a roll 16. As shown in FIG. 2, the silicon layer 24 of the substrate 22 is wound on top of the dry coating. The roll 16 can then be cured for a desired period of time. In one embodiment, the roll 16 can be placed in a foil bag that acts as a barrier to substantially reduce or minimize the evaporation of moisture from the film 12, as well as minimize the flashing of flavor. The roll 16 could be kept in the foil bag for any suitable period of time to complete the curing process, typically 2 to 5 days, most typically approximately four days.

After the roll 16 has cured for a suitable length of time, the film 12 can be converted. This includes cutting and packaging the film 12. As shown in FIG. 1, in one embodiment where the substrate 14 has not been delaminated, the roll 16 is unwound and the substrate 14 is delaminated from the dried film 12. The substrate 14 can be rewound into a roll 18. The film 12 then travels through a cutting device 19 that cuts the web of film into any suitable number of strips along a length of the web. Each strip is then cut to a desired length to form the segments 8. The segments 8, also called strips, can then be packaged for distribution.

Figure 3:
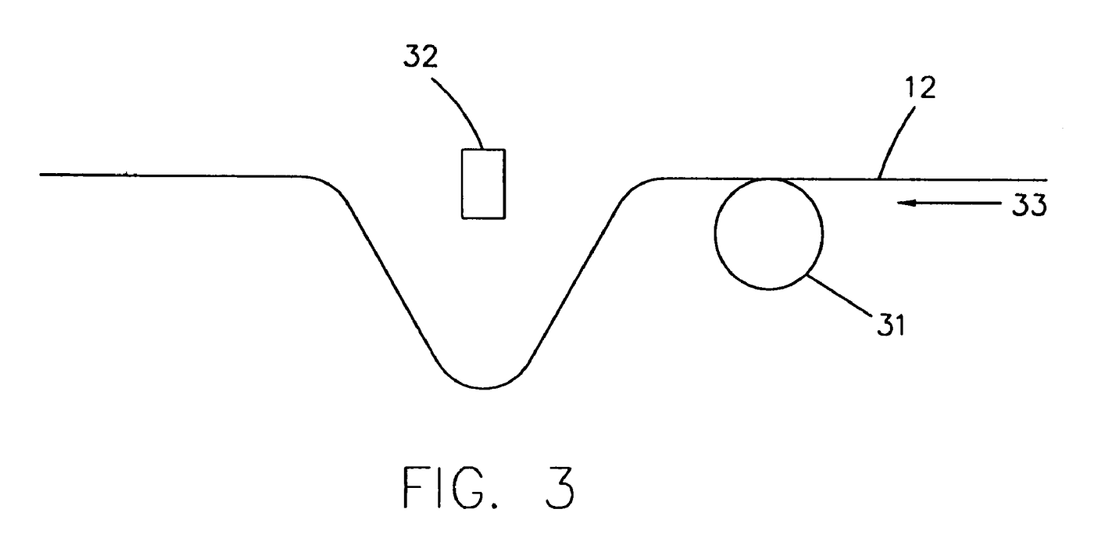
FIG. 3 is a side view of a portion of the cutting process in a system incorporating features of the present invention.

One embodiment of a converting or cutting process is described with reference to FIG. 3. As the film 12 comes off or away from the liner 14, the film 12 passes over a cutting device 31. The cutting device 31 generally comprises a series of slitters that slit or cut the film or web 12 into strips along the direction of travel 33 of the web. Tension control devices and static control devices (not shown) are used to maintain the composition of the web.

Figure 4:
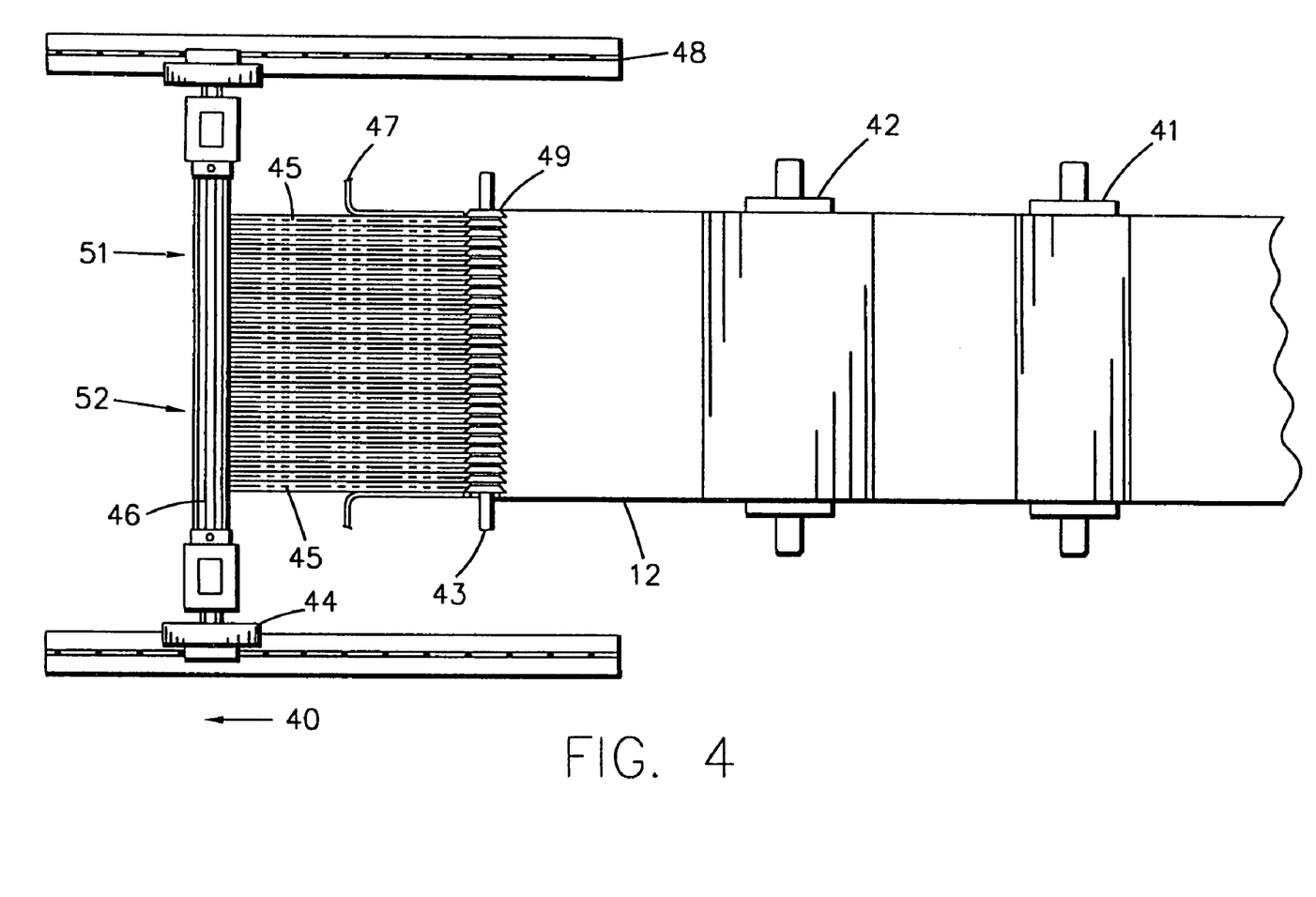
FIG. 4 is a top plan view of a cutting mechanism for a system incorporating features of the present invention.

Referring to FIG. 4, another embodiment of a converting process is illustrated. As shown in FIG. 4, the cured roll 41 of material in unwound. The backing substrate can be rewound onto a material unwind roll 42. The coated web 12 then proceeds over the slitter 43. The slitter 43 generally comprises a series of cutting devices. In one embodiment, the slitter 43 comprises a device having a twenty-five slitters 49, although any suitable number of cutting devices can be used. Each individual slitter 49 cuts the web 12 along the direction of travel of the web flow 40. In the example shown in FIG. 4, after the web 12 passes through or over the slitter 43 and is cut, twenty-four separate film strips or lanes 45 are formed. The edge trim selvage 47 can be discarded.

The twenty-four strips 45 travel through a cutting device 44. In one embodiment, the cutting device 44 comprises a guillotine shear. The cutting device 44 is generally adapted to cut each strip 45 into smaller pieces or segments, such as segments 8 shown in FIG. 1. Generally, any suitable cutting device 44 can be used to cut the film strips 45 into the small pieces 8. It is a feature of the present invention to cut the film strips 45 into a size that is adapted to be inserted into the mouth, for example on or under the tongue.

After the web 12 is slitted, each strip 45 is pulled over a turnbar 46. Approximately one-half of the strips 45 can be pulled towards one side 51, while the other half can be pulled toward the other side 52. The strips 45 are pulled and make an approximately 90° turn around the turnbar 46. A gripper 53 is adapted to grip a top and bottom of each strip 45 and pull the strip 45 in approximately 1¼ inch increments. After the strips 45 are moved into position by the gripper, a guillotine cut is made. Each cut results in twelve pieces of the film strips 45 formed at each cut at each side of the turn bar 46. When a predetermined amount of cuts are made, such as for example twelve, the pieces 8 of FIG. 1 are pushed into a stack. The stack can then moved into a cassette base.

Figure 5:
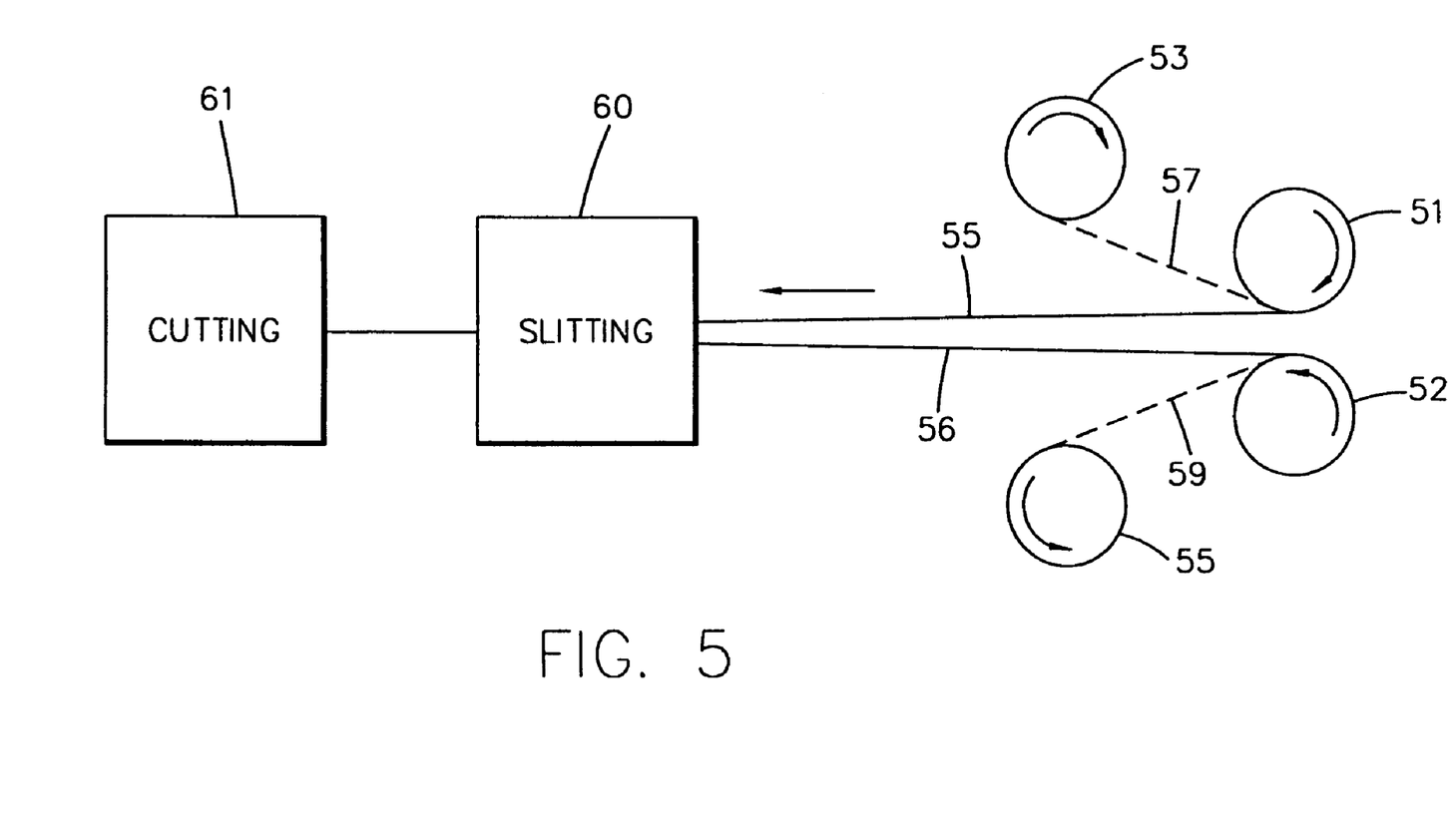
FIG. 5 is a side view of one embodiment of the converting process in accordance with features of the present invention.

In one embodiment, referring to FIG. 5, two rolls 51, 52 of cured film can be converted at the same time, one on top of the other. If not already delaminated, the backing substrate 57, 59 from each roll 51, 52 can be delaminated and rolled onto rolls 53, 55. The two webs 55, 56 of the formed film can then be processed in the slitting stage 60 and the cutting stages 61. In this fashion, 24 strips of film can be cut in a single pass of the guillotine shear 44 of FIG. 4.

Figure 6:
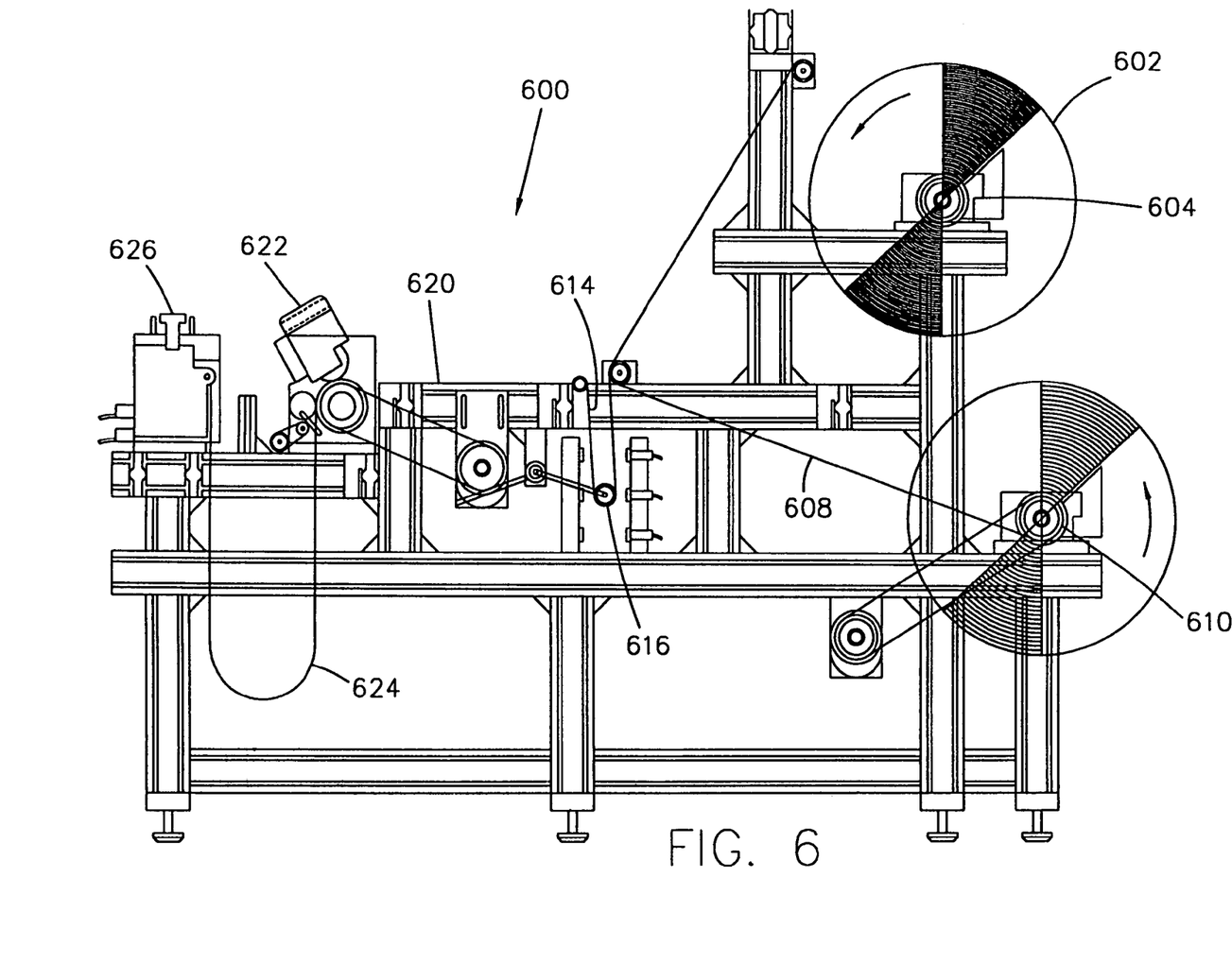
FIG. 6 is a side view of one embodiment of the converter system in a thin film manufacturing process incorporating features of the present invention.

Referring to FIG. 6, one embodiment of a system 600 for converting a thin film material into small strips is illustrated. The product strip web and carrier web 602 is placed on an unwind roll 604. The combination of the product strip web and carrier web 602, which has been cured in a process similar to that described with respect to FIG. 2, is unwound off the roll 604 and fed into a delaminating section 606, where the paper backing 608 of the carrier web is delaminated from the product strip web and rolled onto a rewind roll 610. The delaminating section 606 is adapted to allow the paper or backing to be peeled away from or off of the roll 602. In one embodiment of the invention the delaminating section 606 comprises a dancer including a counterweight 616 that allows tension to be applied to the backing paper 608 and not the product strip 614. The product strip 614 can be looped down and across to the splicing table 620.

Figure 7:
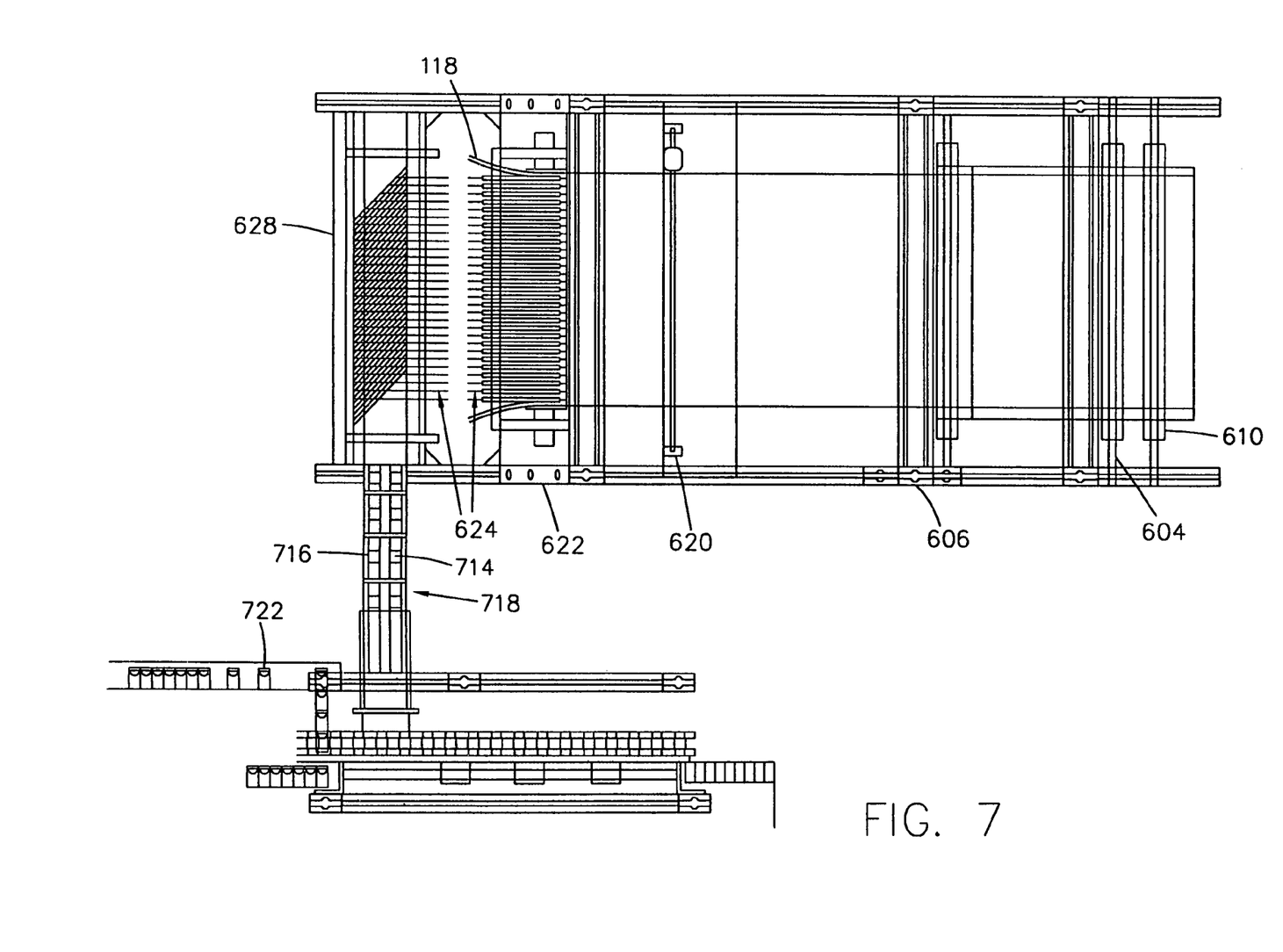
FIG. 7 is a top view of the system illustrated in FIG. 6.
Figure 8:
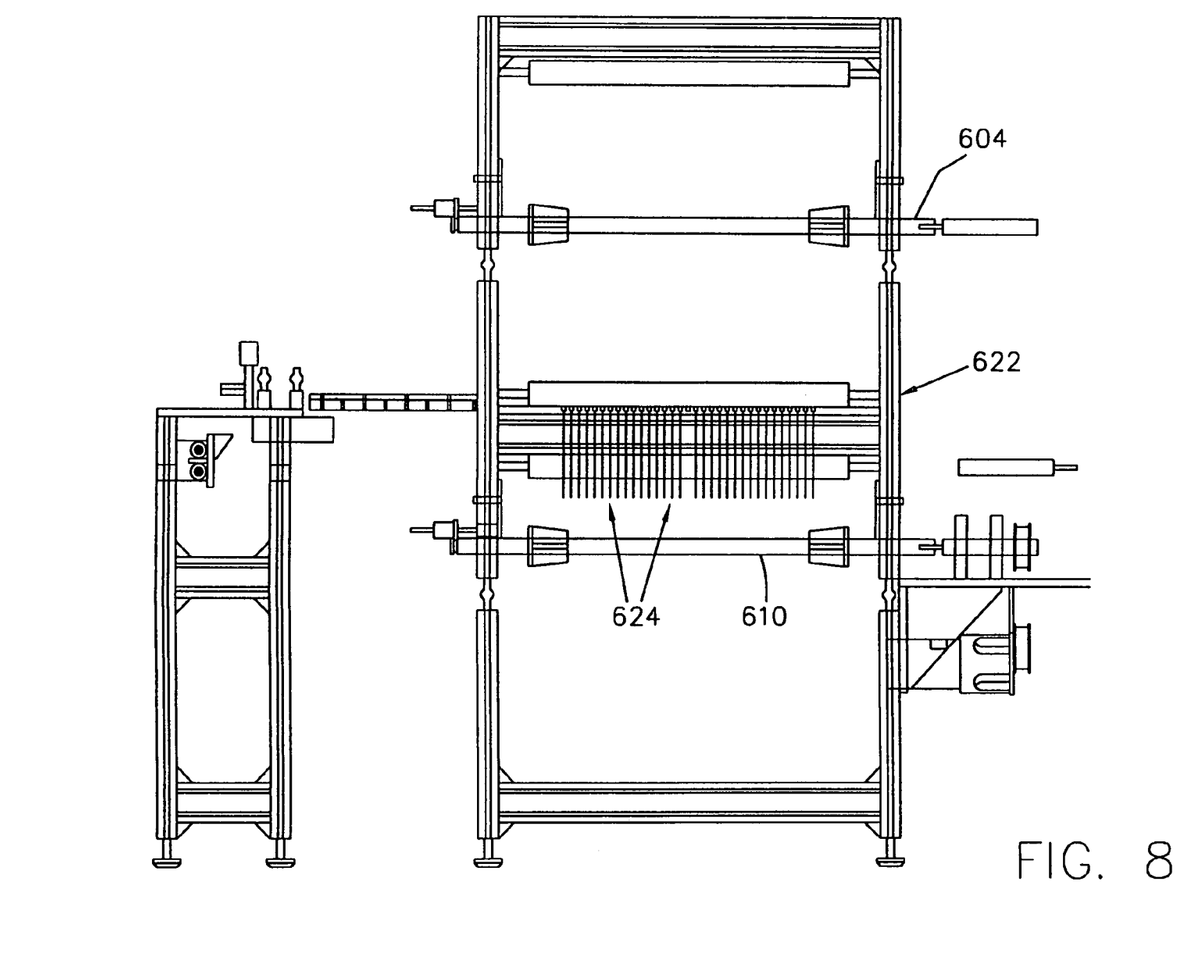
FIG. 8 is an end view of the system illustrated in FIG. 6.

The full sheet 614 is fed onto the splicing table 620 and into a cutter 622, where the sheet 614 is cut or slit lengthwise into strips. In one embodiment, the cutter 622 can comprise a DOSENBURY CRUSH CUT KNIFE ASSEMBLY, although any suitable knife assembly can be used. As shown in FIG. 7, the knife assembly 622 preferably comprise a series of twenty-five slitters to slit the full sheet into twenty-four strips 624, each approximately ⅞" wide (_mm). Although the strips are described as being approximately ⅞" wide, the strips 624 can be any suitable dimension. The outer strips 710, or selvage, can be discarded.

Referring to FIG. 7, the strips 624 are then pulled or directed over a turn bar assembly 628. The turn bar assembly 628 generally comprises a series of bars over which each strip 624 is directed. Each turn bar is angled at approximately 45°, which allows each strip 624 to loop over the bar and turn approximately 90°. This allows each strip 624 to be positioned one on top of another. In one embodiment, where the product web 614 is slit into twenty-four strips, all twenty-four strips can be stacked. In an alternate embodiment, the turn bars can be positioned so that where twenty-four product strips are available, two rows of twelve strips each are formed or one row of twenty-four.

A shear 626 is adapted to cut across a width of each slit strip 624. The shear or knife assembly 626 cuts each stack of strips 624 into segments, such as for example, one-inch (2.54 cm) segments. The segments, each having a plurality of one-inch product strips can then be packaged. Where twenty-four strips have been turned on top of each other, a stack of twenty-four, one-inch segments will be formed. The segments 714 shown in FIG. 7 are then moved along a conveyor 718 and deposited into suitable sized containers 722, such as for example a cassette. The containers 722 can then be transported to a labeler or other sortable processing station.

In one embodiment, the product web 614 is slitted into a series of strips 624. The strips 624 are looped down and then up across each turn bar in the turn bar assembly 628. A clamp device can be used to clamp the strip while the knife cuts the strip.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of forming a thin film strip composed of a mixture of film forming ingredients and other components comprising the steps of:
   coating a liner substrate with a wet slurry of the mixture of film forming ingredients and other components;
   drying the wet slurry in a drying oven to form a film;
   measuring a moisture content of the film as the film exists in the drying oven; and
   storing the film in a minimal moisture loss environment during a curing process.

2. The method of claim 1 further comprising the steps of: converting the film into thin strips; and packaging the thin strips into compact dispensers.

3. The method of claim 1 wherein the step of converting further comprises the steps of: slitting the film into a series of strips along a direction of travel of the web; and cutting each strip along a direction substantially perpendicular to the direction of travel of the web in order to form small segments of the film that are suitably sized for ingestion.

4. The method of claim 3 further comprising the step, prior to the step of cutting, of turning each strip around a turn bar, wherein approximately one half of the series of strips are turned in one direction and all remaining strips in the series are turned in an opposite direction.

5. The method of claim 1 wherein the liner is delaminated from the film after curing.

6. The method of claim 1 wherein the liner is delaminated from the slurry of film after coating.

7. The method of claim 1 wherein a first surface of the substrate comprises a polyethylene material and a second opposing side comprising a silicone material, wherein the first surface is coated with the wet slurry.

8. The method of claim 1 wherein the step of drying further comprises the step of drying the slurry in a multizone reflow oven and varying a temperature of each zone of the oven in increasing increments.

9. The method of claim 1 wherein the step of drying further comprises the step of recirculating air flowing through the oven in order to minimize an amount of volatile active components in the coating that is flushed off the slurry.

10. The method of claim 1 wherein the step of measuring the moisture content of the film comprises the step of using an inline infra red moisture meter to traverse at least a portion of a web of the film as it exits the drying oven to measure the moisture content.

11. The method of claim 1 further comprising the step of regulating a speed of the slurry traveling through the drying oven based upon the measure moisture content of the film as the film exits the drying oven.

12. The method of claim 1 where the other components comprise cosmetic or skin care products.

13. The method of claim 12 where the polymer is a water soluble polymer, the film strip is applied to a users skin and moisture present on the users skin dissolves the polymer and releases the cosmetic or skin care product.

14. The method of claim 12 where the polymer is selected from the group consisting of water soluble polymers are pullulan, hydroxypropylethyl cellulose, hydroxyethyl cellulose, hydroxypropyl cellulose, carboxymethyl cellulose, sodium alginate, pectin, and mixtures thereof.

15. The method of claim 14 where the polymers are selected from the group consisting of pullulan, pectin and mixtures thereof.

16. The method of claim 12 where the polymer is a low-temperature-melt polymer and the heat on the users skin melts the polymer and releases the cosmetic or skin care product.

17. The method of claim 16 where the low temperature melt polymer has a melt point in the range of from about 70 to about 95° F.

* * * * *